(12) United States Patent
Sun et al.

(10) Patent No.: US 12,282,353 B2
(45) Date of Patent: Apr. 22, 2025

(54) CLOCK CONTROL CIRCUIT MODULE, MEMORY STORAGE DEVICE AND CLOCK CONTROL METHOD

(71) Applicant: PHISON ELECTRONICS CORP., Miaoli (TW)

(72) Inventors: Shih-Yang Sun, Taoyuan (TW); Guan-Wei Wu, New Taipei (TW)

(73) Assignee: PHISON ELECTRONICS CORP., Miaoli (TW)

( * ) Notice: Subject to any disclaimer, the term of this patent is extended or adjusted under 35 U.S.C. 154(b) by 168 days.

(21) Appl. No.: 18/306,974

(22) Filed: Apr. 25, 2023

(65) Prior Publication Data

US 2024/0310870 A1    Sep. 19, 2024

(30) Foreign Application Priority Data

Mar. 16, 2023   (TW) .................................. 112109859

(51) Int. Cl.
*G06F 1/08* (2006.01)
(52) U.S. Cl.
CPC ...................................... *G06F 1/08* (2013.01)
(58) Field of Classification Search
CPC ........................................................ G06F 1/08
See application file for complete search history.

(56) References Cited

U.S. PATENT DOCUMENTS

| | | | |
|---|---|---|---|
| 8,311,157 B2 * | 11/2012 | Fukuda | H03L 7/08 327/147 |
| 9,319,050 B1 * | 4/2016 | Guilford | H03L 7/0812 |
| 2009/0213973 A1 * | 8/2009 | Yanagidate | H04L 7/0331 375/371 |
| 2017/0031436 A1 * | 2/2017 | Wu | A61B 3/11 |

\* cited by examiner

*Primary Examiner* — Glenn A. Auve
(74) *Attorney, Agent, or Firm* — JCIPRNET

(57) ABSTRACT

A clock control circuit module, a memory storage device, and a clock control method are disclosed. The clock control circuit module is configured to: generate a clock signal; receive a first signal and the clock signal and sample the first signal according to the clock signal to generate a first sampling signal and a second sampling signal; obtain first position information corresponding to a first transition point of a first target signal and second position information corresponding to a second transition point of a second target signal according to the first sampling signal and the second sampling signal respectively; and evaluate a frequency shift status between the first signal and the clock signal according to the first position information and the second position information.

30 Claims, 4 Drawing Sheets

CLOCK CONTROL CIRCUIT MODULE, MEMORY STORAGE DEVICE AND CLOCK CONTROL METHOD

CROSS-REFERENCE TO RELATED APPLICATION

This application claims the priority benefit of Taiwan application serial no. 112109859, filed on Mar. 16, 2023. The entirety of the above-mentioned patent application is hereby incorporated by reference herein and made a part of this specification.

BACKGROUND OF THE INVENTION

Field of the Invention

The invention relates to a clock control technique, and in particular to a clock control circuit module, a memory storage device, and a clock control method.

Description of Related Art

Most signal receivers are equipped with a phase detector. The phase detector may be configured to align the phase of a received data signal with the phase of an internal clock signal used to sample the data signal, so as to improve the sampling accuracy of the data signal. However, as the transmission speed of the data signal becomes faster, it becomes more difficult to align the phase of the data signal with the phase of the internal clock signal. In addition, once the frequency difference between the data signal and the internal clock signal is too large, the general phase detector may not work smoothly. In order to alleviate the above issues, some types of signal receivers are additionally provided with a frequency detector to help reduce the frequency difference between the data signal and the internal clock signal.

Common frequency detectors include a frequency detector based on a reference clock signal (also called Clock FD) and a frequency detector based on a data signal (also called Data FD). The frequency detector based on a reference clock signal may track the frequency of the reference clock signal to correct the frequency of the internal clock signal. Then, the phase of the received data signal is aligned with the phase of the internal clock signal via a phase detector. However, the use of this type of frequency detector still may not solve the issue that the frequency of the data signal and the frequency of the reference clock signal are too large, leading to the issue that the phase detector may not work smoothly. Moreover, the frequency detector based on the data signal may sequentially sample the data signal using a plurality of internal clock signals with different phases and evaluate whether the frequency of the data signal is higher or lower than the frequency of the internal clock signal according to the sampling result. However, this type of frequency detector needs to use internal clock signals with various phases during operation, and is therefore not suitable for all types of signal receivers. All of the above drawbacks lead to a decrease in the sampling accuracy of the data signal by the signal receiver.

SUMMARY OF THE INVENTION

The invention provides a clock control circuit module, a memory storage device, and a clock control method that may improve the signal receiving quality of a signal receiver.

An exemplary embodiment of the invention provides a clock control circuit module including a clock generation circuit, a sampling circuit, and a control circuit. The clock generation circuit is configured to generate a clock signal. The sampling circuit is configured to sample a first signal according to the clock signal and generate a sampling signal, wherein the sampling signal includes a first sampling signal and a second sampling signal, the first sampling signal reflects a first sampling result of the clock signal on a first target signal in the first signal, and the second sampling signal reflects a second sampling result of the clock signal on a second target signal in the first signal. The control circuit is coupled to the clock generation circuit and the sampling circuit. The control circuit is configured to: obtain first position information corresponding to a first transition point of the first target signal and second position information corresponding to a second transition point of the second target signal respectively according to the first sampling signal and the second sampling signal; and evaluate a frequency shift status between the first signal and the clock signal according to the first position information and the second position information.

An exemplary embodiment of the invention further provides a memory storage device including a connection interface unit, a rewritable non-volatile memory module, a memory control circuit unit, and a clock control circuit module. The connection interface unit is configured to be coupled to a host system. The memory control circuit unit is coupled to the connection interface unit and the rewritable non-volatile memory module. The clock control circuit module is disposed in the connection interface unit. The clock control circuit module is configured to: generate a clock signal; receive a first signal and the clock signal and sample the first signal according to the clock signal to generate a sampling signal, wherein the sampling signal includes a first sampling signal and a second sampling signal, the first sampling signal reflects a first sampling result of the clock signal on a first target signal in the first signal, and the second sampling signal reflects a second sampling result of the clock signal on a second target signal in the first signal; obtain first position information corresponding to a first transition point of the first target signal and second position information corresponding to a second transition point of the second target signal respectively according to the first sampling signal and the second sampling signal; and evaluate a frequency shift status between the first signal and the clock signal according to the first position information and the second position information.

An exemplary embodiment of the invention further provides a clock control method including: generating a clock signal; receiving a first signal and the clock signal and sampling the first signal according to the clock signal to generate a sampling signal, wherein the sampling signal includes a first sampling signal and a second sampling signal, the first sampling signal reflects a first sampling result of the clock signal on a first target signal in the first signal, and the second sampling signal reflects a second sampling result of the clock signal on a second target signal in the first signal; obtaining first position information corresponding to a first transition point of the first target signal and second position information corresponding to a second transition point of the second target signal respectively according to the first sampling signal and the second sampling signal; and evaluating a frequency shift status between the first signal and the clock signal according to the first position information and the second position information.

Based on the above, after the first signal is received, the clock signal may be configured to sample the first signal to generate the first sampling signal and the second sampling signal. In particular, the first sampling signal may reflect the first sampling result of the clock signal on the first target signal in the first signal, and the second sampling signal may reflect the second sampling result of the clock signal on the second target signal in the first signal. Then, the first position information corresponding to the first transition point of the first target signal and the second position information corresponding to the second transition point of the second target signal may be respectively obtained according to the first sampling signal and the second sampling signal. In addition, the frequency shift status between the first signal and the clock signal may be estimated according to the first position information and the second position information. Thereby, the signal receiving quality of a signal receiver may be improved.

DESCRIPTION OF THE EMBODIMENTS

A plurality of exemplary embodiments are presented below to illustrate the invention, but the invention is not limited to the plurality of exemplary embodiments illustrated. Also, appropriate combinations are allowed between the exemplary embodiments. The term "coupled to" used in the entire text of the specification of the present application (including claims) may refer to any direct or indirect connecting means. For example, if the text describes a first device is coupled to a second device, it should be understood that the first device may be directly connected to the second device, or the first device may be indirectly connected to the second device via other devices or certain connecting means. In addition, the term "signal" may refer to at least one current, voltage, charge, temperature, data, or any other one or a plurality of signals.

Figure 1:
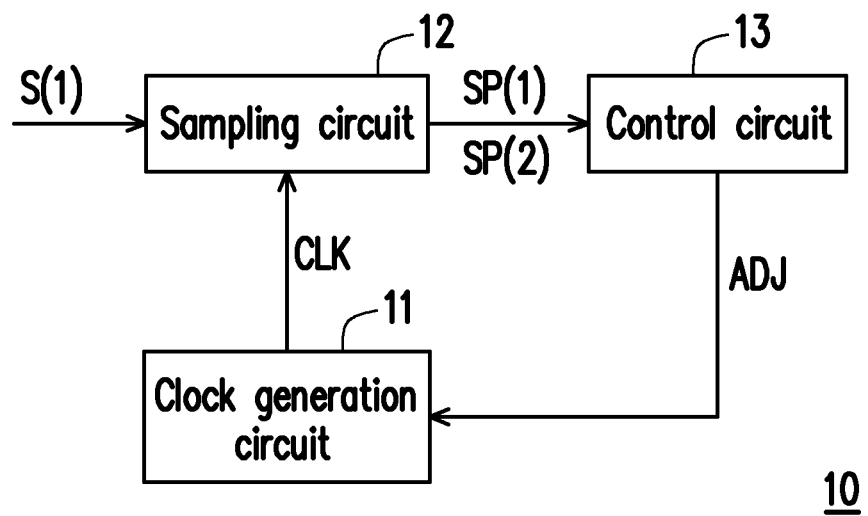
FIG. 1 is a schematic diagram of a clock control circuit module shown according to an exemplary embodiment of the invention.

FIG. 1 is a schematic diagram of a clock control circuit module shown according to an exemplary embodiment of the invention.

Referring to FIG. 1, a clock control circuit module 10 includes a clock generation circuit 11, a sampling circuit 12, and a control circuit 13. The clock generation circuit 11 is configured to generate a signal (also called a clock signal) CLK. For example, the signal CLK may be generated by a voltage-controlled oscillator (VCO) in the clock generation circuit 11 or other types of oscillating circuits. The signal CLK may have a specific frequency.

The clock generation circuit 11 is coupled to the sampling circuit 12. The sampling circuit 12 may be configured to receive a signal (also called a first signal) S(1) and the signal CLK. For example, the signal S(1) is provided by an external device, and the signal CLK is provided by the clock generation circuit 11. In addition, the signal S(1) also has a specific frequency. The frequency of the signal S(1) may be different from the frequency of the signal CLK. For example, the frequency of the signal CLK may be higher than the frequency of the signal S(1).

The sampling circuit 12 may also be configured to sample the signal S(1) according to the signal CLK and generate a sampling signal. For example, the sampling circuit 12 may sequentially sample the signal S(1) using the rising edge and/or the falling edge of the signal CLK to generate the sampling signal.

It should be noted that the sampling signal includes a signal (also called a first sampling signal) SP(1) and a signal (also called a second sampling signal) SP(2). The signal SP(1) may reflect a sampling result (also called a first sampling result) of the signal CLK on a specific signal (also called a first target signal) in the signal S(1). The signal SP(2) may reflect the sampling result (also called a second sampling result) of the signal CLK on another signal (also called a second target signal) in the signal S(1). For example, the sampling circuit 12 may sample the first target signal and the second target signal in the signal S(1) sequentially using the rising edge and/or the falling edge of the signal CLK to generate the signals SP(1) and SP(2).

The control circuit 13 is coupled to the clock generation circuit 11 and the sampling circuit 12. The control circuit 13 may be configured to receive the sampling signal (including the signals SP(1) and SP(2)). The control circuit 13 may obtain position information (also called first position information) corresponding to a transition point (also called a first transition point) of the first target signal and position information (also called second position information) corresponding to a transition point (also called a second transition point) of the second target signal according to the sampling signal (including the signals SP(1) and SP(2)). Then, the control circuit 13 may evaluate the frequency shift status between the signal S(1) and the signal CLK according to the first position information and the second position information. For example, the frequency shift status is related to the frequency difference between the signal S(1) and the signal CLK. Or, from another point of view, the frequency shift status may reflect or correspond to the frequency difference between the signal S(1) and the signal CLK.

In an exemplary embodiment, the sampling circuit 12 may sample the signal S(1) (including the first target signal and the second target signal) based on a plurality of sampling windows of the signal CLK and generate the signals SP(1) and SP(2) sequentially. Therefore, the first position information may reflect that one transition point (i.e., the first transition point) of the first target signal is located at a specific position (also called a first position) in a certain sampling window (also called a first sampling window) of the signal CLK. In addition, the second position information may reflect that one transition point (i.e., the second transition point) of the second target signal is located at a specific position (also called a second position) of the signal CLK in another sampling window (also called a second sampling window). The time length of the first sampling window is the same as the time length of the second sampling window.

In an exemplary embodiment, the first position information includes one count value (also called a first count value), and the second position information includes another count value (also called a second count value). The first count value corresponds to the first position. The second count value corresponds to the second position. The control circuit 13 may evaluate the frequency shift status between the signal S(1) and the signal CLK according to the difference between the first count value and the second count value. For example, the control circuit 13 may subtract the second count value from the first count value or subtract the first count value from the second count value to obtain the difference between the first count value and the second count value. Then, the control circuit 13 may evaluate the frequency shift status between the signal S(1) and the signal CLK according to the difference. For example, the difference may be positively related to the frequency difference between the signal S(1) and the signal CLK. For example, if the difference is larger, it means that the frequency difference between the signal S(1) and the signal CLK is larger.

In an exemplary embodiment, the control circuit 13 may analyze the sampling signal generated by the sampling circuit 12 continuously. For example, the control circuit 13 may determine whether the sampling signal meets a preset condition. In response to the sampling signal meeting the preset condition, the control circuit 13 may determine that the first target signal in the signal S(1) is detected. In response to detecting the first target signal, the control circuit 13 may obtain the first position information (such as the first count value) corresponding to the transition point (i.e., the first transition point) of the first target signal according to the first sampling result. Then, the control circuit 13 may analyze the sampling signal generated by the sampling circuit 12 continuously. In response to the sampling signal meeting the preset condition again, the control circuit 13 may determine that the second target signal in the signal S(1) is detected. In response to detecting the second target signal, the control circuit 13 may obtain the second position information (such as the second count value) corresponding to the transition point (i.e., the second transition point) of the second target signal according to the second sampling result. Then, the control circuit 13 may evaluate the frequency shift status between the signal S(1) and the signal CLK according to the first count value and the second count value.

In an exemplary embodiment, the control circuit 13 may determine whether there are a plurality of consecutive bits "1" (or "0") in the sampling result corresponding to the sampling signal. In response to the plurality of consecutive bits "1" (or "0") in the sampling result, the control circuit 13 may determine that the sampling signal meets a preset condition. However, if the plurality of consecutive bits "1" (or "0") are not in the sampling result, the control circuit 13 may determine that the sampling signal does not meet the preset condition.

In an exemplary embodiment, the plurality of consecutive bits "1" (or "0") may refer to a plurality of consecutive bits "1" (or "0") reaching or exceeding a preset amount. For example, the preset amount may be 16, 32, or other amounts, which is not limited in the invention. In addition, the plurality of consecutive bits "1" (or "0") may be located in a single sampling window of the signal CLK or across a plurality of sampling windows of the signal CLK.

In an exemplary embodiment, the control circuit 13 may control the clock generation circuit 11 to adjust the frequency of the signal CLK according to the frequency shift status between the signal S(1) and the signal CLK. For example, according to the frequency shift status, the control circuit 13 may generate a signal (also called an adjustment signal) ADJ. The control circuit 13 may control the clock generation circuit 11 to adjust (for example, increase or decrease) the frequency of the signal CLK via the signal ADJ. For example, assuming that the frequency shift status reflects that the frequency of the signal S(1) is higher than the frequency of the signal CLK, the control circuit 13 may increase the frequency of the signal CLK via the signal ADJ, so as to reduce the frequency difference between the signal CLK and the signal S(1). Or, assuming that the frequency shift status reflects that the frequency of the signal S(1) is lower than the frequency of the signal CLK, the control circuit 13 may reduce the frequency of the signal CLK via the signal ADJ, so as to reduce the frequency difference between the signal CLK and the signal S(1). Thereby, the frequency of the adjusted signal CLK may be closer to the frequency of the signal S(1), or even be completely the same as the frequency of the signal S(1). Compared to the unadjusted signal CLK, using the adjusted signal CLK to sample the data signal in the signal S(1) may effectively improve the sampling quality of the data signal (e.g., sampling accuracy).

Figure 2:
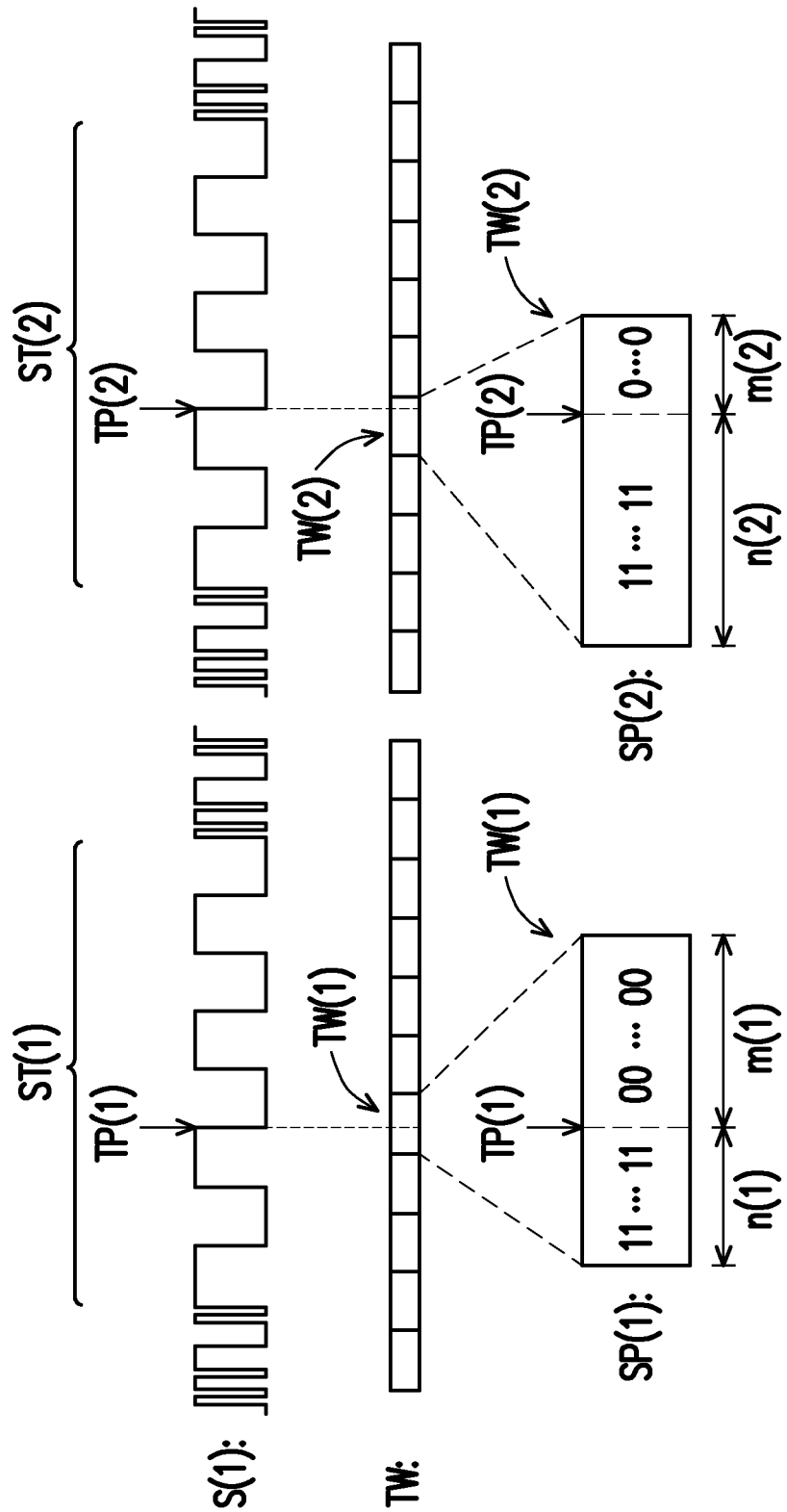
FIG. 2 is a schematic diagram of sampling a first signal based on a plurality of sampling windows of a clock signal to generate a first sampling signal and a second sampling signal shown according to an exemplary embodiment of the invention.

FIG. 2 is a schematic diagram of sampling a first signal based on a plurality of sampling windows of a clock signal to generate a first sampling signal and a second sampling signal shown according to an exemplary embodiment of the invention.

Referring to FIG. 1 and FIG. 2, it is assumed that the first target signal includes a signal ST(1) and the second target signal includes a signal ST(2). The signal ST(1) and the signal ST(2) may be carried in the signal S(1) in different time ranges. The frequency and/or waveform of the signal ST(1) and the signal ST(2) are the same. For example, in the signal S(1), the frequencies of the signal ST(1) and the signal ST(2) may be lower than the frequencies of the rest of the signals, as shown in FIG. 2. In addition, the frequencies of the signal ST(1) and the signal ST(2) may be lower than the frequency of the signal CLK. In another exemplary embodiment, the signal ST(1) and the signal ST(2) may be a set of signals with a fixed pattern, for example, the signal ST(1) and the signal ST(2) may be configured to transmit 16 or other amount of consecutive 0/1 sequences respectively.

The sampling circuit 12 may sample the signal S(1) based on a plurality of consecutive sampling windows TW corresponding to the signal CLK. For example, in a certain sampling window TW, the signal CLK may be configured to sample the signal S(1) continuously a k number of times to obtain a k number of sampling values. k may be any integer greater than 1. The k number of sampling values may be reflected in the sampling window TW, and the signal S(1) is sampled continuously a k number of times by using the signal CLK.

In an exemplary embodiment, the signal SP(1) may reflect or present, in a sampling window TW(1) (i.e., the first sampling window), the sampling result (i.e., the first sampling result) of the signal CLK on the signal ST(1). For example, the signal SP(1) may reflect or present that in the sampling window TW(1), the sampling result of the signal ST(1) by the signal CLK includes an n(1) number of consecutive bits "1" and an m(1) number of consecutive bits "0". In response to n(1) and/or m(1) being greater than a preset value (i.e., the sampling signal meets a preset condition), the control circuit 13 may determine that the first target signal is detected. In response to detecting the first target signal, the control circuit 13 may determine one count value (i.e., the first count value) according to n(1) and/or m(1). For example, the first count value may be equal to n(1) or m(1). In particular, in the sampling window TW(1), the junction position of the n(1) number of consecutive bits "1" and the m(1) number of consecutive bits "0" reflects the position (i.e., the first position) of a transition point TP(1) (i.e., the first transition point) of the signal ST(1). Or, from another point of view, the first count value may reflect the position of the transition point TP(1) of the signal ST(1) in the sampling window TW(1).

In an exemplary embodiment, the signal SP(2) may reflect or present, in a sampling window TW(2) (i.e., the second sampling window), the sampling result (i.e., the second sampling result) of the signal CLK on the signal ST(2). For example, the signal SP(2) may reflect or present that in the sampling window TW(2), the sampling result of the signal ST(2) by the signal CLK includes an n(2) number of consecutive bits "1" and an m(2) number of consecutive bits "0". In response to n(2) and/or m(2) being greater than a preset value (i.e., the sampling signal meets a preset condition again), the control circuit 13 may determine that the second target signal is detected. In response to detecting the second target signal, the control circuit 13 may determine one count value (i.e., the second count value) according to n(2) and/or m(2). For example, the second count value may be equal to n(2) or m(2). In particular, in the sampling window TW(2), the junction position of the n(2) number of consecutive bits "1" and the m(2) number of consecutive bits "0" reflects the position (i.e., the second position) of the transition point TP(2) (i.e., the second transition point) of the signal ST(2). Or, from another point of view, the second count value may reflect the position of the transition point TP(2) of the signal ST(2) in the sampling window TW(2).

In an exemplary embodiment, the difference between n(1) and n(2) (i.e., the difference between the first count value and the second count value) is positively related to the frequency difference between the signal S(1) and the signal CLK. For example, a larger difference between n(1) and n(2) indicates a larger frequency difference between the signal S(1) and the signal CLK. Therefore, the control circuit 13 may evaluate the frequency shift status between the signal S(1) and the signal CLK according to the difference between n(1) and n(2). Then, the control circuit 13 may adjust the frequency of the signal CLK according to the frequency shift status. For example, assuming that n(1) is 4 and n(2) is 8, the frequency of the signal CLK is higher than the frequency of the signal S(1). Therefore, the control circuit 13 may instruct the clock generation circuit 11 to slightly reduce the frequency of the signal CLK. Or, assuming that n(1) is 28 and n(2) is 6, the frequency of the signal CLK is lower than the frequency of the signal S(1). Therefore, the control circuit 13 may instruct the clock generation circuit 11 to slightly increase the frequency of the signal CLK. In addition, the adjustment range of the frequency of the signal CLK may also be positively related to the difference between n(1) and n(2) (i.e., the difference between the first count value and the second count value).

In an exemplary embodiment, the difference between m(1) and m(2) (i.e., the difference between the first count value and the second count value) is also positively related to the frequency difference between the signal S(1) and the signal CLK. For example, a larger difference between m(1) and m(2) indicates a larger frequency difference between the signal S(1) and the signal CLK. Therefore, the control circuit 13 may evaluate the frequency shift status between the signal S(1) and the signal CLK according to the difference between m(1) and m(2). Then, the control circuit 13 may adjust the frequency of the signal CLK according to the frequency shift status.

Figure 3:
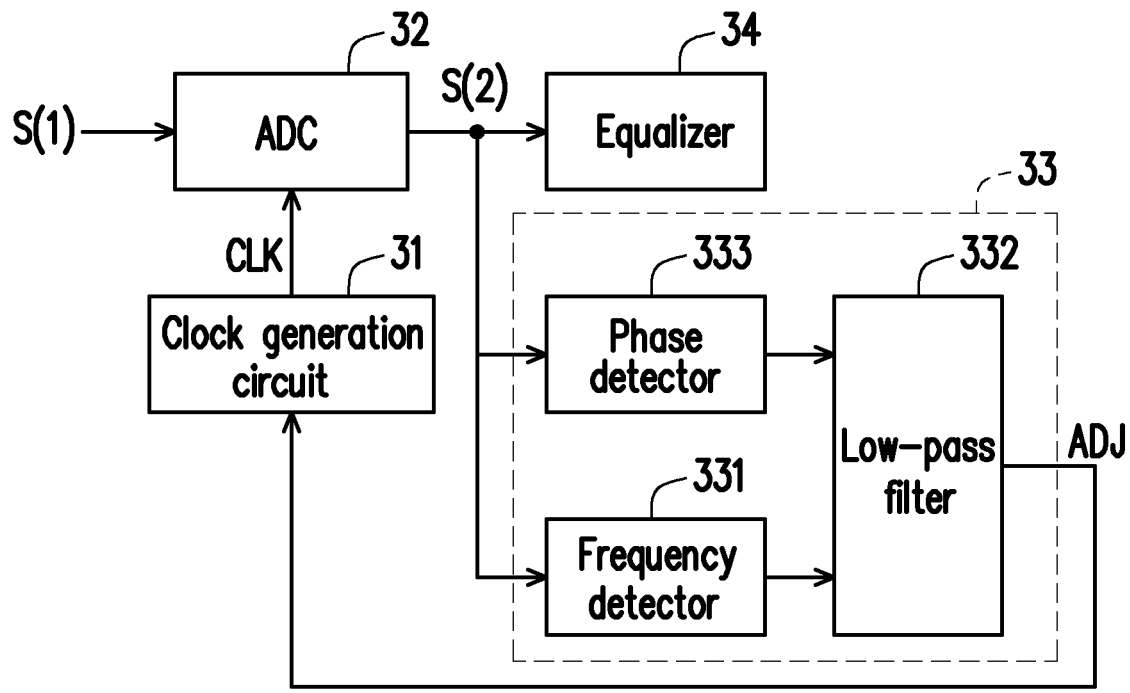
FIG. 3 is a schematic diagram of a clock control circuit module shown according to an exemplary embodiment of the invention.

FIG. 3 is a schematic diagram of a clock control circuit module shown according to an exemplary embodiment of the invention.

Referring to FIG. 3, a clock control circuit module 30 includes a clock generation circuit 31, an analog-to-digital converter (ADC) 32, a control circuit 33, and an equalizer 34. The clock generation circuit 31 may include the clock generation circuit 11 of FIG. 1. For example, the clock generation circuit 31 may be configured to generate the signal CLK.

The ADC 32 is coupled to the clock generation circuit 31. The ADC 32 may include the sampling circuit 12 of FIG. 1. For example, the ADC 32 may sample the signal S(1) according to the signal CLK and generate the signal S(2). The signal S(2) may reflect the sampling result of the signal S(1) by the signal CLK. For example, the signal S(2) may include the signal SP(1) (i.e., the first target signal) and the signal SP(2) (i.e., the second target signal) of FIG. 1 and/or FIG. 2.

The control circuit 33 is coupled to the ADC 32 and the clock generation circuit 31. The control circuit 33 may include the control circuit 13 of FIG. 1. The control circuit 33 may obtain the position information (i.e., the first position information) corresponding to the transition point (i.e., the first transition point) of the first target signal and the position information (i.e., the second position information) corresponding to the transition point (i.e., the second transition point) of the second target signal according to the signal S(2). Then, the control circuit 33 may evaluate the frequency shift status between the signal S(1) and the signal CLK according to the first position information and the second position information. Then, the control circuit 33 may send the signal ADJ according to the frequency shift status to instruct the clock generation circuit 31 to adjust the frequency of the signal CLK.

In an exemplary embodiment, the control circuit 33 includes a frequency detector 331, a low-pass filter 332, and a phase detector 333. The frequency detector 331 is coupled to the ADC 32. The frequency detector 331 may receive the signal S(2) and detect the frequency shift status between the signal S(1) and the signal CLK according to the signal S(2). For example, the frequency detector 331 may detect the frequency shift status between the signal S(1) and the signal CLK with reference to the descriptions of the exemplary embodiments of FIG. 1 and FIG. 2, which is not be repeated herein.

The low-pass filter 332 is coupled to the frequency detector 331 and the phase detector 333. The low-pass filter 332 may generate the signal ADJ according to the detection result of the frequency detector 331 to adjust the frequency of the signal CLK. The phase detector 333 is coupled to the ADC 32 and the low-pass filter 332.

The phase detector 333 may receive the signal S(2) and detect the frequency shift status between the signal S(1) and the signal CLK according to the signal S(2). The phase shift status may reflect or correspond to the phase difference between the signal S(1) and the signal CLK. For example, the phase detector 333 may evaluate whether the phase of the signal S(1) leads or lags the phase of the signal CLK according to the sampling results of the continuous sampling of the signal S(1) by the signal CLK reflected by the signal S(2). The phase detector 333 may include any known phase detector, which is not repeated herein. Then, the low-pass filter 332 may generate the signal ADJ according to the detection result of the phase detector 333 to adjust the phase or the frequency of the signal CLK.

In an exemplary embodiment, when the frequency and/or the phase of the signal CLK is just starting to be calibrated, the control circuit 33 may first activate the frequency detector 331 to adjust the frequency of the signal CLK. For example, the activation of the frequency detector 331 may include turning on a signal path from the frequency detector 331 to the low-pass filter 332 and/or cutting off a signal path from the phase detector 333 to the low-pass filter 332. After the frequency detector 331 is activated, the control circuit 33 may detect the frequency shift status between the signal S(1) and the signal CLK via the frequency detector 331 and control the clock generation circuit 31 to adjust the frequency of the signal CLK according to the frequency shift status. Accordingly, when the frequency and/or the phase of the signal CLK is just started to be calibrated, the control circuit 33 may give priority to reducing the frequency difference between the signal S(1) and the signal CLK.

After the frequency adjustment of the signal CLK is completed (for example, the frequency difference between the signal S(1) and the signal CLK is less than a preset value), the control circuit 33 may activate the phase detector 333 to adjust the phase of the signal CLK. For example, the activation of the phase detector 333 may include turning on a signal path from the phase detector 333 to the low-pass filter 332 and/or cutting off a signal path from the frequency detector 331 to the low-pass filter 332. After the phase detector 333 is activated, the control circuit 33 may detect the phase shift status between the signal S(1) and the signal CLK via the phase detector 333 and control the clock generation circuit 31 to adjust the phase of the signal CLK according to the phase shift status. Thereby, the control circuit 33 may further reduce the phase difference between the signal S(1) and the signal CLK when the frequency calibration of the signal CLK is preliminarily completed.

The equalizer 34 is coupled to the ADC 32. The equalizer 34 may be configured to compensate the output of the ADC 32 (i.e., the signal S(2)). For example, the equalizer 34 may include a feed-forward equalization (FFE) equalizer and/or other types of equalizers.

In an exemplary embodiment, by sequentially adjusting the frequency and the phase of the signal CLK, the past issue that the phase detector 333 may not be operated normally due to the phase difference or the frequency difference between the signal S(1) and the signal CLK being too large may be effectively alleviated. Moreover, during the operation of the frequency detector 331, there is also no need to introduce an additional reference clock signal or adopt a multi-phase signal CLK to sample the signal S(1), thereby effectively improving the versatility of the frequency detector 331.

Figure 4:
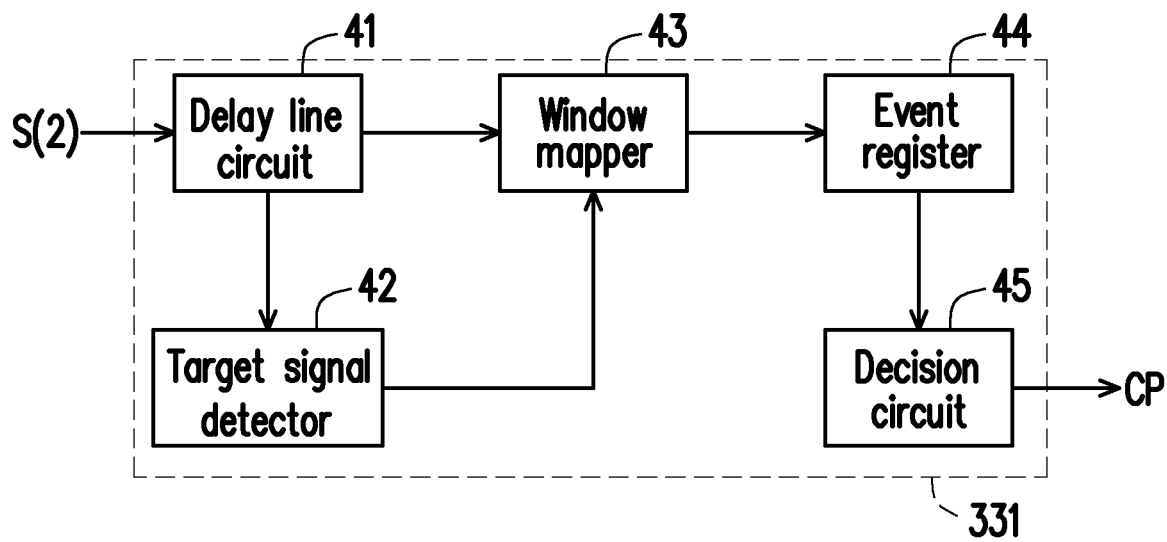
FIG. 4 is a schematic diagram of a frequency detector shown according to an exemplary embodiment of the invention.

FIG. 4 is a schematic diagram of a frequency detector shown according to an exemplary embodiment of the invention.

Please refer to FIG. 3 and FIG. 4, in an exemplary embodiment, the frequency detector 331 includes a delay line circuit 41, a target signal detector 42, a window mapper 43, an event register 44, and a decision circuit 45. The delay line circuit 41 may be configured to receive the signal S(2) and provide the delayed signal S(2) to the target signal detector 42. The target signal detector 42 may analyze the delayed signal S(2) to detect whether the first target signal and/or the second target signal exist(s) in the signal S(1). Taking FIG. 2 as an example, the target signal detector 42 may respectively detect the signals ST(1) and ST(2) according to the signals SP(1) and SP(2) meeting the preset condition.

In an exemplary embodiment, in response to the presence of the first target signal in the signal S(1), the target signal detector 42 may notify the window mapper 43 to obtain the position information (i.e., the first position information) corresponding to the transition point (i.e., the first transition point) of the first target signal. For example, in response to the first notification from the target signal detector 42, the window mapper 43 may store the first count value (i.e., the first position information) in the event register 44. Later, in response to the target signal detector 42 determining that there is a second target signal in the signal S(1), the target signal detector 42 may notify the window mapper 43 again to obtain the position information (i.e., the second position information) corresponding to the transition point (i.e., the second transition point) of the second target signal. For example, in response to the second notification of the target signal detector 42, the window mapper 43 may store the second count value (i.e., the second position information) in the event register 44.

In an exemplary embodiment, after the first count value (i.e., the first position information) and the second count value (i.e., the second position information) are stored in the event register 44, the decision circuit 45 may generate a signal (also called a control signal) CT according to the difference between the first count value (i.e., the first position information) and the second count value (i.e., the second position information) in the event register 44. The signal CT may be used to control the low-pass filter 332 of FIG. 3 to generate the corresponding signal ADJ to adjust the frequency of the signal CLK. In addition, other relevant operation details are all described in the above exemplary embodiments, and are not repeated herein.

It should be noted that the internal structures of the clock control circuit module and the frequency detector shown in the exemplary embodiments of FIG. 1, FIG. 3, and FIG. 4 are only examples, and are not intended to limit the invention. That is to say, the coupling relationship between the clock control circuit module and each electronic circuit in the frequency detector may be adjusted according to practical requirements. In addition, the clock control circuit module and the frequency detector may also include other types of electronic circuits to provide additional functions, which is not limited by the invention.

In an exemplary embodiment, the clock control circuit module 10 or 30 may be disposed in a memory storage device. Alternatively, in an exemplary embodiment, the clock control circuit module 10 or 30 may also be disposed in any type of electronic device, which is not limited by the invention.

Figure 5:
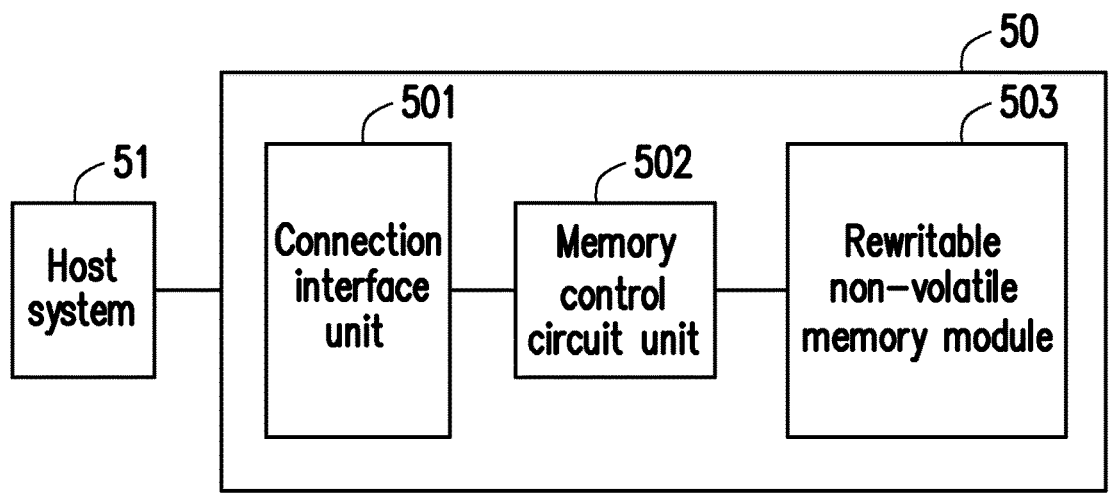
FIG. 5 is a schematic diagram of a memory storage device shown according to an exemplary embodiment of the invention.

FIG. 5 is a schematic diagram of a memory storage device shown according to an exemplary embodiment of the invention.

Referring to FIG. 5, a memory storage device 50 includes a connection interface unit 501, a memory control circuit unit 502, and a rewritable non-volatile memory module 503. The clock control circuit module 10 or 30 may be disposed in the memory storage device 50.

The connection interface unit 501 is configured to couple the memory storage device 50 to the host system 51. The memory storage device 50 may be communicated with the host system 51 via the connection interface unit 501. In an exemplary embodiment, the connection interface unit 501 is compatible with the Peripheral Component Interconnect Express (PCI Express) standard. In an exemplary embodiment, the connection interface unit 501 may also conform to the Serial Advanced Technology Attachment (SATA) standard, Parallel Advanced Technology Attachment (PATA) standard, Institute of Electrical and Electronic Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, Universal Flash Storage (UFS) interface standard, eMCP interface standard, CF interface standard, Integrated Device Electronics (IDE) standard, or other suitable standards. The connection interface unit 501 may be sealed in a chip with the memory control circuit unit 502. Alternatively, the connection interface unit 501 is disposed outside of a chip containing the memory control circuit unit 502.

The memory control circuit unit 502 is coupled to the connection interface unit 501 and the rewritable non-volatile memory module 503. The memory control circuit unit 502 is configured to execute a plurality of logic gates or control commands implemented in a hardware form or in a firmware form. The memory control circuit unit 404 also performs operations such as writing, reading, and erasing data in the rewritable non-volatile memory storage module 503 according to the commands of the host system.

The rewritable non-volatile memory module 503 is configured to store the data written by the host system 51. The rewritable non-volatile memory module 503 may include a single-level cell (SLC) NAND-type flash memory module (i.e., a flash memory module that may store 1 bit in one memory cell), a multi-level cell (MLC) NAND-type flash memory module (i.e., a flash memory module that may store 2 bits in one memory cell), a triple-level cell (TLC) NAND-type flash memory module (i.e., a flash memory module that may store 3 bits in one memory cell), a quad-level cell (QLC) NAND-type flash memory module (i.e., a flash memory module that may store 4 bits in one memory cell), other flash memory modules, or other memory modules with the same characteristics.

Each of the memory cells in the rewritable non-volatile memory module 503 stores one or a plurality of bits via the change in voltage (also called threshold voltage hereinafter). Specifically, a charge-trapping layer is disposed between the control gate and the channel of each of the memory cells. By applying a write voltage to the control gate, the number of electrons of the charge-trapping layer may be changed, and therefore the threshold voltage of the memory cells may be changed. This operation of changing the threshold voltage of the memory cells is also called "writing data to the memory cells" or "programming the memory cells". As the threshold voltage is changed, each of the memory cells in the rewritable non-volatile memory module 503 has a plurality of storage statuses. Which storage status one memory cell belongs to may be determined via the application of a read voltage, so as to obtain one or a plurality of bits stored by the memory cell.

In an exemplary embodiment, the memory cells of the rewritable non-volatile memory module 503 may form a plurality of physical programming units, and the physical programming units may form a plurality of physical erasing units. Specifically, the memory cells on the same word line may form one or a plurality of physical programming units. If one memory cell may store two or more bits, the physical programming units on the same word line may at least be classified into lower physical programming units and upper physical programming units. For example, the least significant bit (LSB) of a memory cell belongs to the lower physical programming units, and the most significant bit (MSB) of a memory cell belongs to the upper physical programming unit. Generally, in an MLC NAND-type flash memory, the write speed of the lower physical programming unit is greater than the write speed of the upper physical programming unit, and/or the reliability of the lower physical programming units is greater than the reliability of the upper physical programming units.

In an exemplary embodiment, the physical programming unit is the smallest unit of programming. That is, the physical programming unit is the smallest unit of data writing. For example, the physical programming unit may be a physical page or a physical sector. If the physical programming unit is a physical page, then the physical programming unit may include a data bit area and a redundancy bit area. The data bit area contains a plurality of physical sectors configured to store user data, and the redundancy bit area is configured to store system data (for example, management data such as an error correcting code). In an exemplary embodiment, the data bit area includes 32 physical sectors, and the size of one physical sector is 512 bytes (B). However, in other exemplary embodiments, the data bit area may also contain 8, 16, or a greater or lesser number of physical sectors, and the size of each of the physical sectors may also be greater or smaller. Moreover, the physical erasing unit is the smallest unit of erasing. That is, each of the physical erasing units contains the smallest number of memory cells erased together. For example, the physical erasing unit is a physical block.

In an exemplary embodiment, the clock control circuit module 10 or 30 may be disposed in the connection interface unit 501. Therefore, the first signal (i.e., the signal S(1) of FIG. 1 or FIG. 3) may include a signal from the host system 51. Alternatively, in an exemplary embodiment, the clock control circuit module 10 or 30 may also be disposed in the memory control circuit unit 502 and/or the rewritable non-volatile memory module 503.

In an exemplary embodiment, the first target signal and the second target signal in the first signal (i.e., the signal S(1) of FIG. 1 or FIG. 3) are received from the host system 51 during the handshake phase between the memory storage device 50 and the host system 51. For example, when the connection between the memory storage device 50 and the host system 51 is just established or the connection between the memory storage device 50 and the host system 51 is unstable, the memory storage device 50 may enter into the handshake phase with the host system 51. In the handshake phase, the memory storage device 50 may perform a handshake operation with the host system 51 to perform an interactive action such as clock calibration and/or voltage calibration with the host system 51.

In an exemplary embodiment, the first target signal and the second target signal are used to transmit identification information about the communication standard between the memory storage device 50 and the host system 51 during the handshake phase, such as an EIEOSQ message in the PCI Express standard. Moreover, the first target signal and the second target signal may also include other signals having similar properties (i.e., having the same signal state and being repeatedly transmitted in the first signal according to specific rules), which is not limited in the invention.

In an exemplary embodiment, the first signal (i.e., the signal S(1) of FIG. 1 or FIG. 3) may carry a data signal from the host system 51 after leaving the handshake phase. For example, the data signal may carry a data bit that the host system 51 is to store in the memory storage device 50. In an exemplary embodiment, by adjusting the signal CLK of FIG. 1 or FIG. 3, the subsequent sampling quality of the data signal may be improved.

Figure 6:
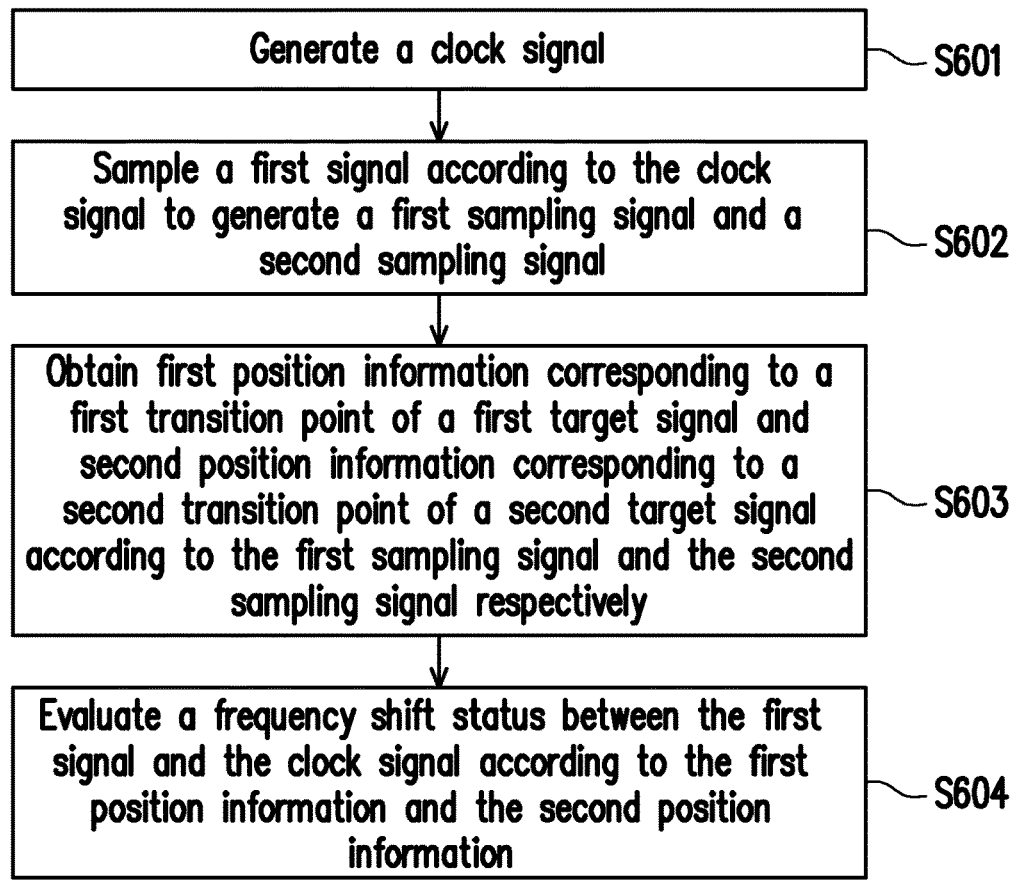
FIG. 6 is a flowchart of a clock control method shown according to an exemplary embodiment of the invention.

FIG. 6 is a flowchart of a clock control method shown according to an exemplary embodiment of the invention.

Referring to FIG. 6, in step S601, a clock signal is generated. In step S602, a first signal is sampled according to the clock signal to generate a first sampling signal and a second sampling signal. In step S603, first position information corresponding to a first transition point of a first target signal and second position information corresponding to a second transition point of a second target signal are obtained respectively according to the first sampling signal and the second sampling signal. In step S604, a frequency shift status between the first signal and the clock signal is evaluated according to the first position information and the second position information.

However, each step in FIG. 6 is as described in detail above, and is not repeated herein. It should be mentioned that, each step in FIG. 6 may be implemented as a plurality of program codes or circuits, and the present application is not limited thereto. Moreover, the method of FIG. 6 may be used with the above exemplary embodiments, and may also be used alone, and the present application is not limited thereto.

Based on the above, the clock control circuit module, the memory storage device, and the clock control method provided by the embodiments of the invention may effectively evaluate (and reduce) the frequency difference between the first signal and the clock signal without introducing an additional reference clock signal and without adopting a multi-phase clock signal to sample the first signal. Thereby, the signal receiving quality of a signal receiver may be effectively improved.

Although the present application has been disclosed by the above embodiments, they are not intended to limit the present application. It is apparent to one of ordinary skill in the art that modifications and variations to the present application may be made without departing from the spirit and scope of the present application. Accordingly, the protection scope of the present application will be defined by the appended claims.

What is claimed is:

1. A clock control circuit module, comprising:
a clock generation circuit configured to generate a clock signal;
a sampling circuit configured to sample a first signal according to the clock signal and generate a sampling signal, wherein the sampling signal comprises a first sampling signal and a second sampling signal, the first sampling signal reflects a first sampling result of the clock signal on a first target signal in the first signal, and the second sampling signal reflects a second sampling result of the clock signal on a second target signal in the first signal; and
a control circuit coupled to the clock generation circuit and the sampling circuit,
wherein the control circuit is configured to:
obtain first position information corresponding to a first transition point of the first target signal and second position information corresponding to a second transition point of the second target signal respectively according to the first sampling signal and the second sampling signal; and
evaluate a frequency shift status between the first signal and the clock signal according to the first position information and the second position information.

2. The clock control circuit module of claim 1, wherein the first position information reflects that the first transition point is located at a first position in a first sampling window of the clock signal, and the second position information reflects that the second transition point is located at a second position in a second sampling window of the clock signal.

3. The clock control circuit module of claim 2, wherein a time length of the first sampling window is the same as a time length of the second sampling window.

4. The clock control circuit module of claim 1, wherein the first position information comprises a first count value, the second position information comprises a second count value, and the operation of the control circuit evaluating the frequency shift status between the first signal and the clock signal according to the first position information and the second position information comprises:
evaluating the frequency shift status between the first signal and the clock signal according to a difference between the first count value and the second count value.

5. The clock control circuit module of claim 4, wherein the difference is positively related to a frequency difference between the first signal and the clock signal.

6. The clock control circuit module of claim 1, wherein the operation of the control circuit obtaining the first position information corresponding to the first transition point of the first target signal and the second position information corresponding to the second transition point of the second target signal respectively according to the first sampling signal and the second sampling signal comprises:
analyzing the sampling signal continuously;
determining that the first target signal in the first signal is detected in response to the sampling signal meeting a preset condition;
obtaining the first position information corresponding to the first transition point according to the first sampling result in response to detecting the first target signal;
determining that the second target signal in the first signal is detected in response to the sampling signal meeting the preset condition again; and
obtaining the second position information corresponding to the second transition point according to the second sampling result in response to detecting the second target signal.

7. The clock control circuit module of claim 1, wherein the control circuit is further configured to:
control the clock generation circuit to adjust a frequency of the clock signal according to the frequency shift status.

8. The clock control circuit module of claim 1, wherein the clock control circuit module is disposed in a memory storage device, and the first target signal and the second target signal are received from a host system during a handshake phase between the memory storage device and the host system.

9. The clock control circuit module of claim 1, wherein the control circuit comprises:
a phase detector;
a frequency detector; and
a low-pass filter coupled to the phase detector, the frequency detector, and the clock generation circuit,
wherein the phase detector is configured to detect a phase shift status between the first signal and the clock signal, the frequency detector is configured to detect the frequency shift status between the first signal and the clock signal, and the low-pass filter is configured to control the clock generation circuit to adjust a frequency of the clock signal according to a detection result of at least one of the phase detector and the frequency detector.

10. The clock control circuit module of claim 9, wherein the frequency detector comprises:
a delay line circuit;
a target signal detector coupled to the delay line circuit;
a window mapper coupled to the delay line circuit and the target signal detector;
an event register coupled to the window mapper; and
a decision circuit coupled to the event register,
wherein the delay line circuit is configured to receive the sampling signal,
the target signal detector is configured to detect the first target signal and the second target signal in the first signal according to the sampling signal,
the window mapper is configured to obtain the first position information in response to the first target signal and obtain the second position information in response to the second target signal,
the event register is configured to store the first position information and the second position information, and
the decision circuit is configured to generate a control signal according to the first position information and the second position information, so as to control the low-pass filter to adjust the frequency of the clock signal.

11. A memory storage device, comprising:
a connection interface unit configured to be coupled to a host system;
a rewritable non-volatile memory module;
a memory control circuit unit coupled to the connection interface unit and the rewritable non-volatile memory module; and
a clock control circuit module disposed in the connection interface unit,
wherein the clock control circuit module is configured to:
generate a clock signal;
receive a first signal and the clock signal and sample the first signal according to the clock signal to generate a sampling signal, wherein the sampling signal comprises a first sampling signal and a second sampling signal, the first sampling signal reflects a first sampling result of the clock signal on a first target signal in the first signal, and the second sampling signal reflects a second sampling result of the clock signal on a second target signal in the first signal;
obtain first position information corresponding to a first transition point of the first target signal and second position information corresponding to a second transition point of the second target signal respectively according to the first sampling signal and the second sampling signal; and
evaluate a frequency shift status between the first signal and the clock signal according to the first position information and the second position information.

12. The memory storage device of claim 11, wherein the first position information reflects that the first transition point is located at a first position in a first sampling window of the clock signal, and the second position information reflects that the second transition point is located at a second position in a second sampling window of the clock signal.

13. The memory storage device of claim 12, wherein a time length of the first sampling window is the same as a time length of the second sampling window.

14. The memory storage device of claim 11, wherein the first position information comprises a first count value, the second position information comprises a second count value, and the operation of the clock control circuit module evaluating the frequency shift status between the first signal and the clock signal according to the first position information and the second position information comprises:
evaluating the frequency shift status between the first signal and the clock signal according to a difference between the first count value and the second count value.

15. The memory storage device of claim 14, wherein the difference is positively related to a frequency difference between the first signal and the clock signal.

16. The memory storage device of claim 11, wherein the operation of the clock control circuit module obtaining the first position information corresponding to the first transition point of the first target signal and the second position information corresponding to the second transition point of the second target signal respectively according to the first sampling signal and the second sampling signal comprises:
analyzing the sampling signal continuously;
determining that the first target signal in the first signal is detected in response to the sampling signal meeting a preset condition;
obtaining the first position information corresponding to the first transition point according to the first sampling result in response to detecting the first target signal;
determining that the second target signal in the first signal is detected in response to the sampling signal meeting the preset condition again; and
obtaining the second position information corresponding to the second transition point according to the second sampling result in response to detecting the second target signal.

17. The memory storage device of claim 11, wherein the clock control circuit module is further configured to:
adjust a frequency of the clock signal according to the frequency shift status.

18. The memory storage device of claim 11, wherein the first target signal and the second target signal are received from the host system during a handshake phase between the memory storage device and the host system.

19. The memory storage device of claim 11, wherein the clock control circuit module comprises:
a phase detector;
a frequency detector; and
a low-pass filter coupled to the phase detector and the frequency detector,
wherein the phase detector is configured to detect a phase shift status between the first signal and the clock signal,
the frequency detector is configured to detect the frequency shift status between the first signal and the clock signal, and
the low-pass filter is configured to adjust a frequency of the clock signal according to a detection result of at least one of the phase detector and the frequency detector.

20. The memory storage device of claim 19, wherein the frequency detector comprises:
a delay line circuit;
a target signal detector coupled to the delay line circuit;
a window mapper coupled to the delay line circuit and the target signal detector;
an event register coupled to the window mapper; and
a decision circuit coupled to the event register, wherein the delay line circuit is configured to receive the first sampling signal and the second sampling signal, the target signal detector is configured to detect the first target signal and the second target signal in the first signal according to the sampling signal, the window mapper is configured to obtain the first position information in response to the first target signal and obtain the second position information in response to the second target signal, the event register is configured to store the first position information and the second position information, and the decision circuit is configured to generate a control signal according to the first position information and the second position information, so as to control the low-pass filter to adjust the frequency of the clock signal.

21. A clock control method, comprising:

generating a clock signal;

receiving a first signal and the clock signal and sampling the first signal according to the clock signal to generate a sampling signal, wherein the sampling signal comprises a first sampling signal and a second sampling signal, the first sampling signal reflects a first sampling result of the clock signal on a first target signal in the first signal, and the second sampling signal reflects a second sampling result of the clock signal on a second target signal in the first signal;

obtaining first position information corresponding to a first transition point of the first target signal and second position information corresponding to a second transition point of the second target signal respectively according to the first sampling signal and the second sampling signal; and evaluating a frequency shift status between the first signal and the clock signal according to the first position information and the second position information.

22. The clock control method of claim 21, wherein the first position information reflects that the first transition point is located at a first position in a first sampling window of the clock signal, and the second position information reflects that the second transition point is located at a second position in a second sampling window of the clock signal.

23. The clock control method of claim 22, wherein a time length of the first sampling window is the same as a time length of the second sampling window.

24. The clock control method of claim 21, wherein the first position information comprises a first count value, the second position information comprises a second count value, and the step of evaluating the frequency shift status between the first signal and the clock signal according to the first position information and the second position information comprises:

evaluating the frequency shift status between the first signal and the clock signal according to a difference between the first count value and the second count value.

25. The clock control method of claim 24, wherein the difference is positively related to a frequency difference between the first signal and the clock signal.

26. The clock control method of claim 21, wherein the step of obtaining the first position information corresponding to the first transition point of the first target signal and the second position information corresponding to the second transition point of the second target signal respectively according to the first sampling signal and the second sampling signal comprises:

analyzing the sampling signal continuously;

determining that the first target signal in the first signal is detected in response to the sampling signal meeting a preset condition;

obtaining the first position information corresponding to the first transition point according to the first sampling result in response to detecting the first target signal;

determining that the second target signal in the first signal is detected in response to the sampling signal meeting the preset condition again; and obtaining the second position information corresponding to the second transition point according to the second sampling result in response to detecting the second target signal.

27. The clock control method of claim 21, further comprising:

adjust a frequency of the clock signal according to the frequency shift status.

28. The clock control method of claim 21, wherein the first target signal and the second target signal are received from a host system during a handshake phase between a memory storage device and the host system.

29. The clock control method of claim 21, further comprising:

detecting a phase shift status between the first signal and the clock signal via a phase detector;

detecting the frequency shift status between the first signal and the clock signal via a frequency detector; and adjusting a frequency of the clock signal according to a detection result of at least one of the phase detector and the frequency detector.

30. The clock control method of claim 29, wherein the step of detecting the frequency shift status between the first signal and the clock signal via the frequency detector comprises:

receiving the sampling signal;

detecting the first target signal and the second target signal in the first signal according to the sampling signal;

obtaining the first position information in response to the first target signal and obtaining the second position information in response to the second target signal;

storing the first position information and the second position information; and generating a control signal according to the first position information and the second position information, so as to adjust the frequency of the clock signal.

* * * * *